US012725857B2

(12) United States Patent
Pham et al.

(10) Patent No.: US 12,725,857 B2
(45) Date of Patent: Sep. 1, 2026

(54) RENEWABLE ENERGY INTEGRATION WITH NATURAL-GAS BASED COMBINED HYDROGEN AND ELECTRICITY PRODUCTION (CHEP) SYSTEM AND METHOD

(71) Applicant: Saudi Arabian Oil Company, Dhahran (SA)

(72) Inventors: Thang Pham, Dhahran (SA); Minseok Bae, Dhahran (SA); Sai P. Katikaneni, Dhahran (SA); Aqil Jamal, Dhahran (SA); Kunho Lee, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 705 days.

(21) Appl. No.: 17/894,720

(22) Filed: Aug. 24, 2022

(65) Prior Publication Data

US 2024/0072339 A1 Feb. 29, 2024

(51) Int. Cl.
*H01M 16/00* (2006.01)
*H01M 8/04082* (2016.01)
*H01M 8/12* (2016.01)

(52) U.S. Cl.
CPC ..... *H01M 16/003* (2013.01); *H01M 8/04201* (2013.01); *H01M 8/12* (2013.01); *H01M 2008/1293* (2013.01); *H01M 2250/10* (2013.01); *H01M 2300/0074* (2013.01)

(58) Field of Classification Search
CPC ............................ H01M 16/00; H01M 16/003
See application file for complete search history.

(56) References Cited

U.S. PATENT DOCUMENTS

| | | | | |
|---|---|---|---|---|
| 4,341,607 | A * | 7/1982 | Tison | H01M 8/0656 204/229.4 |
| 6,841,279 | B1 | 1/2005 | Foger et al. | |
| 9,624,913 | B2 | 4/2017 | Friesth | |
| 9,917,320 | B2 | 3/2018 | Thornton et al. | |
| 10,008,730 | B2 | 6/2018 | Jamal et al. | |
| 10,283,795 | B2 | 5/2019 | Jamal et al. | |

(Continued)

FOREIGN PATENT DOCUMENTS

| | | |
|---|---|---|
| CA | 2937948 | 8/2015 |
| EP | 1683216 | 7/2006 |

(Continued)

OTHER PUBLICATIONS

International Search Report and Written Opinion in International Appln No. PCT/US2023/030919, dated May 16, 2024, 12 pages.

(Continued)

*Primary Examiner* — Jeremiah R Smith
(74) *Attorney, Agent, or Firm* — Fish & Richardson P.C.

(57) ABSTRACT

A method and a system for integrating renewable power with a natural gas hydrogen production plant are provided. An exemplary method include generating electricity and a reformed hydrogen stream in a solid oxide fuel cell (SOFC) stack, and providing the electricity to an electrolyzer to generate an electrolysis hydrogen stream. A second stream of electricity is generated in a renewable energy facility, when available, and providing the second stream of electricity to the electrolyzer to increase the generation of the electrolysis hydrogen stream.

21 Claims, 7 Drawing Sheets

(56) References Cited

U.S. PATENT DOCUMENTS

| | | | | |
|---|---|---|---|---|
| 10,680,265 | B2 | 6/2020 | Jahnke et al. | |
| 2004/0251241 | A1 * | 12/2004 | Blutke | C10J 3/723 48/197 R |
| 2005/0112425 | A1 | 5/2005 | Hsu | |
| 2006/0088739 | A1 * | 4/2006 | Ovshinsky | H01M 8/04216 429/9 |
| 2013/0101873 | A1 * | 4/2013 | Dionne | H01M 8/2483 307/151 |
| 2013/0126038 | A1 * | 5/2013 | Jamal | H01M 8/0618 429/411 |
| 2016/0297727 | A1 | 10/2016 | Modarresi | |
| 2016/0351930 | A1 * | 12/2016 | Jahnke | C25B 1/04 |
| 2017/0207472 | A1 | 7/2017 | Jamal et al. | |
| 2018/0261860 | A1 * | 9/2018 | Jahnke | H01M 8/184 |
| 2018/0261861 | A1 | 9/2018 | Jamal et al. | |
| 2020/0251755 | A1 * | 8/2020 | Jahnke | H01M 8/04097 |
| 2023/0420715 | A1 * | 12/2023 | Weingaertner | H01M 8/04014 |

FOREIGN PATENT DOCUMENTS

| | | | |
|---|---|---|---|
| KR | 101531291 | 7/2015 | |
| KR | 101828938 | 2/2018 | |
| WO | WO 2020118420 | 6/2020 | |
| WO | WO 2022032323 | 2/2022 | |
| WO | WO-2022032323 A1 * | 2/2022 | C25B 1/042 |

OTHER PUBLICATIONS

U.S. Appl. No. 61/562,189, Jamal et al., filed Nov. 21, 2011.

Energy Technology Perspectives, report by IEA, 2020, 400 pages.

FuelCell Energy, "Air Products and FuelCell Energy Begin Construction of High Efficiency Hydrogen Energy Station Demonstration for Combined Hydrogen, Electricity and Heat Generation, System Designed to Address Industrial and Transportation Applications," Globenewswire, Inc., Mar. 2007, 5 pages.

Hydrogen for Net Zero, report by the Hydrogen Council: Mckinsey & Company, Nov. 2021, 56 pages.

Leo, "Tri-Generation Fuel Cells: Opening Doors to Distributed Hydrogen Markets," CryoGas International, Jul. 2016, 3 pages.

Malico et al., "Design of a trigeneration system using a high-temperature fuel cell," International journal of energy research, Special Issue: The changing energy paradigm, challenges and new developments, Feb. 2009, 33:2, 144-151, 8 pages.

Manliclic et al., "Tri-Generation Fuel Cell Technologies for Location-Specific Applications," AN047, Advanced Power and Energy Program, Jun. 17, 2014, 19 pages.

Patel, "Co-production of Hydrogen and Electricity," presentation outline, Transportation and Stationary Power Integration Workshop, Fuel Cell Seminar, 2008, 26 pages.

Perez-Fortes et. al., "Design of a Pilot SOFC System for the Combined Production of Hydrogen and Electricity under Refueling Station Requirements," Fuel Cells, 2019, 19:4, 389-407, 19 pages.

Yu et al., "Combined Hydrogen, Heat and Power (CHHP) pilot plant design," International Journal of Hydrogen Energy, Apr. 22, 2013, 38:12 4881-4888, 8 pages.

* cited by examiner

RENEWABLE ENERGY INTEGRATION WITH NATURAL-GAS BASED COMBINED HYDROGEN AND ELECTRICITY PRODUCTION (CHEP) SYSTEM AND METHOD

TECHNICAL FIELD

The present disclosure is directed to a system that combines renewable energy sources with combined hydrogen and electricity production (CHEP) using natural gas.

BACKGROUND

A steadily increasing amount of carbon dioxide ($CO_2$) in the atmosphere has contributed to environmental problems such as climate change and ocean acidification. Carbon dioxide alone accounts for over 75% of all greenhouse gas emissions. To mitigate this, scientific studies are focusing on capturing and converting $CO_2$ from industries.

Hydrogen is an established and growing global business. At present, about 70 million tons (4.5 million barrels oil equivalent per day, MMboed) of hydrogen are produced annually. The chemical and petroleum refining industries are the largest producers and consumers of hydrogen, controlling more than 90% of the global hydrogen demand. As fuel cell electric vehicles may soon be commercialized, hydrogen demand for transport has the potential to surpass the chemical and petroleum refining industries. Hydrogen use is also expected to grow in power generation, industry, and heat and power in buildings. Numerous companies and nations are pursuing increased hydrogen generation and utilization to establish a robust and commercially viable hydrogen supply chain, for example, creating a hydrogen market.

Further, the use of hydrogen significantly increased the chances of reaching net zero emissions, as it has the potential to abate 80 gigatons of $CO_2$ by 2050. Both low-carbon (termed blue hydrogen) and renewable hydrogen (termed green hydrogen) will be needed to achieve this goal with the former playing a leading role in the short-to-medium term until renewable hydrogen reaches cost competitiveness. Clearly integrated technology concepts that can maximize the advantages of low-carbon and green hydrogen production methods would enable acceleration of hydrogen use as a viable decarbonization energy vector. However, integration is complicated by the intermittent supply of renewable energy, which requires storage capacity for electricity or hydrogen.

SUMMARY

An embodiment described herein provides a method for integrating renewable power with a natural gas hydrogen production plant. The method include generating electricity and a reformed hydrogen stream in a solid oxide fuel cell (SOFC) stack, and providing the electricity to an electrolyzer to generate an electrolysis hydrogen stream. A second stream of electricity is generated in a renewable energy facility, when available, and providing the second stream of electricity to the electrolyzer to increase the generation of the electrolysis hydrogen stream.

Another embodiment described herein provides an integrated hydrogen production system. The integrated hydrogen production system includes a solid oxide fuel cell (SOFC), wherein at least a portion of the SOFC can be operated as a solid oxide electrolytic cell (SOEC), an electrolyzer electrically coupled to a power line from the SOFC. A carbon dioxide capture system is fluidically coupled to an exhaust line from the SOFC. A steam source is fluidically coupled to the SOFC. A hydrocarbon source is fluidically coupled to the SOFC to provide a gaseous hydrocarbon feed to the SOFC, and a renewable energy source, wherein the electrolyzer is coupled to a power line from the renewable energy source.

DETAILED DESCRIPTION

To overcome the intermittent supply of renewable electricity sources for green hydrogen production, a natural gas based combined hydrogen and electricity production (CHEP) system, employing the high and intermediate temperature fuel cell technology, is integrated with a water electrolyzer. The electrolyzer typically operates at a low availability factor for hydrogen production due to the intermittency of renewable electricity. Costly battery or hydrogen storage, and oversizing the renewable generation capacity, are needed to enable hydrogen production at a constant volume. CHEP employing the high temperature fuel cell technology, such as the solid oxide fuel cell (SOFC), or the intermediate temperature fuel cell technology, such as the molten carbonate fuel cell (MCFC), can produce hydrogen and electricity simultaneously. These fuel cells have an ability to rapidly swing the hydrogen and electricity production ratio. The CHEP facility can be configured to capture carbon dioxide formed from a hydrocarbon feedstock. Coupling CHEP with a renewable electricity based electrolyzer enables the electrolyzer to be operated continuously with the electricity provided by CHEP when availability of renewable electricity is limited, for example, at night or when there is insufficient wind available. Further, solid oxide fuel cell units or modules can be operated in electrolysis mode using renewable energy sources to generate additional hydrogen.

Figure 1:
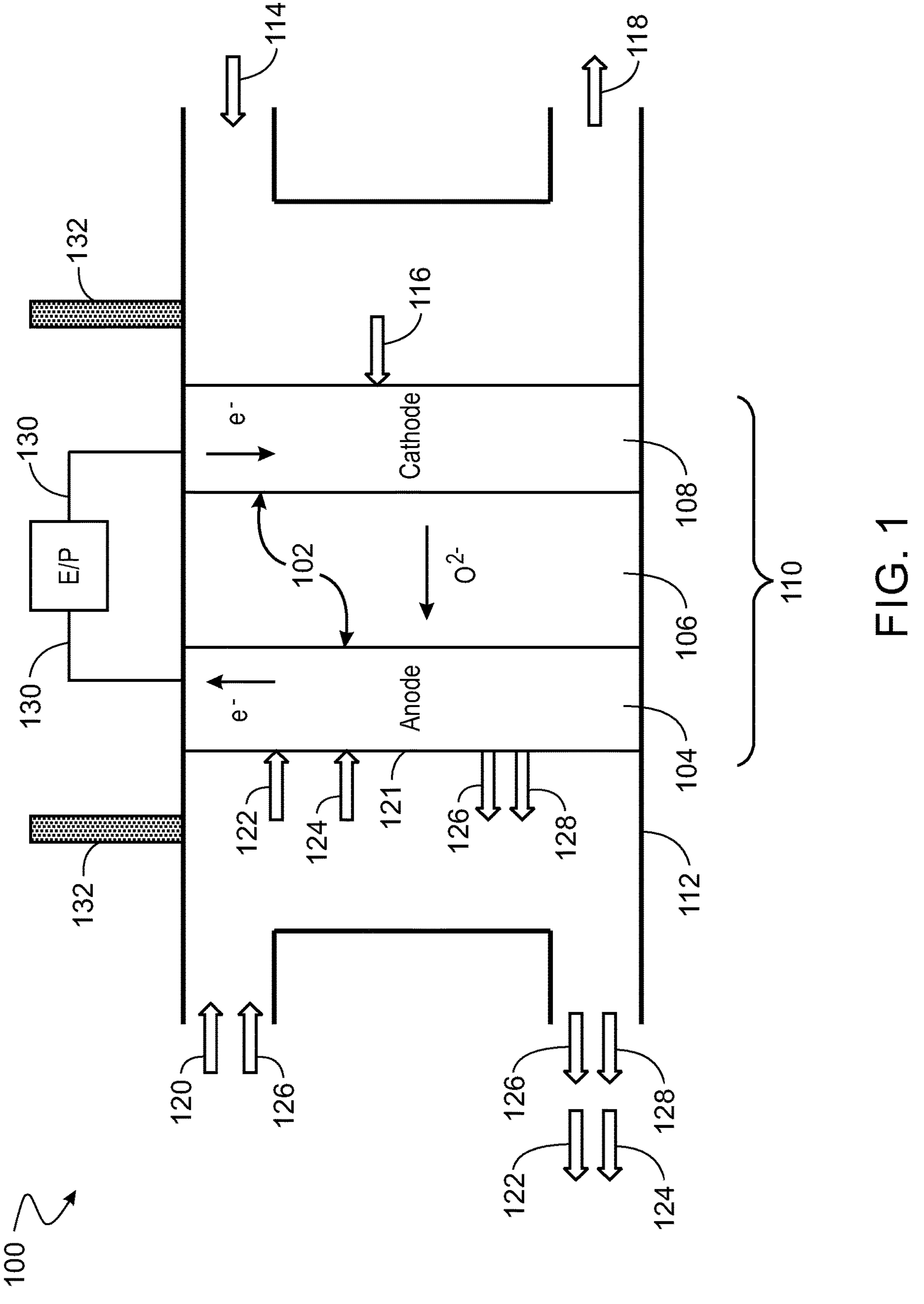
FIG. 1 is a schematic drawing of a solid oxide fuel cell (SOFC) used to provide hydrogen and electricity.

The integration of the CHEP with the renewable energy plant reduces the need for hydrogen and electricity storage, eliminates any need for daily shutdown, which helps to increase the lifetime of the electrolyzer. Further, the hydrogen production efficiency can be tailored to end-user demand, and the CHEP efficiency can be increased by mixing oxygen from the electrolyzer with feed air. Therefore, the system can provide hydrogen for applications like hydrogen fuel cell vehicles, while with utilizing both renewable and nonrenewable power sources, along with $CO_2$ capture capability FIG. 1 is a schematic drawing of a solid oxide fuel cell (SOFC) 100, which performs electrochemistry at the interfaces 102 between the anode 104 and the SO electrolyte 106 and between the SO electrolyte 106 and the cathode 108 to generate power.

In various embodiments, the SO electrolyte is yttria-stabilized zirconia (YSZ), $CeO_2$, or other types of oxygen ion conductors. In contrast to proton exchange membrane fuel cells, which conduct positive hydrogen ions (protons) through a polymer electrolyte from the anode to the cathode, the SOFC uses a solid oxide (SO) electrolyte to conduct negative oxygen ions from the cathode to the anode. As used herein, the anode 104, SO electrolyte 106, and cathode 108, with any catalyst layers, form an electrode assembly (EA) 110, which is supported in a housing 112. The EA 110 forms one unit in a stack in the SOFC 100. For example, the stack may include ten electrode assemblies, 100 electrode assemblies, or more. As shown in FIG. 1, the housing 112 isolates the fluid flows into the EA 110, allowing individual electrode assemblies to be reversed and used as solid oxide electrolytic cells (SOEC).

An inlet in the housing 112 is used to introduce an oxidizing gas 114, such as oxygen 116, to the cathode 108. In some embodiments, oxygen 116 is provided from an electrolyzer to the fuel cell 100 as the oxidizing gas 114. Oxygen 116 reacts at the cathode 108 with electrons to form oxide ions, which are conducted through the SO electrolyte 106 to the anode 104. The half reaction at the cathode 108 is shown below.

$$O_2+4e^-\rightarrow 2O^{2-}$$

Excess amounts of the oxidizing gas 114, which may include inert gases such as nitrogen, exits the housing 112 through an outlet as a waste oxidizer stream 118.

Another inlet in the housing 112 is used to provide fuel 120, such as hydrogen, light hydrocarbons, or syngas, among others, to the anode 104. Depending on the fuel used, a reforming reaction may take place at the anode 104. This reaction may be facilitated by a catalyst 121 disposed on the surface of the anode. The catalyst 121 may include a nickel reforming catalyst, among others.

As the fuel, or reformed fuel, crosses the anode 104, it reacts with the oxygen ions from SO electrolyte 106, releasing electrons. If the fuel is a hydrocarbon, it is reformed to a syngas, including carbon monoxide 122 and hydrogen 124. In this example, the half-reactions at the anode 104 are shown below:

$$H_2+O^{2-}\rightarrow H_2O+2e^-$$

$$CO+O^{2-}\rightarrow CO_2+2e^-$$

The steam 126 and carbon dioxide 128 formed at the cathode 108 exit the housing 112 through an outlet. The electricity 130 is provided to power and electrolyzer. If the fuel 120 only includes the hydrogen 124, only the first half-reaction is relevant. In embodiments where the SOFC 100 is used as a combined hydrogen and electrical plant (CHEP), the fuel 120 is added in excess with steam 126 at the inlet.

Accordingly, in some embodiments, the outlet from the anode 104 includes four gases, carbon monoxide 122, hydrogen 124, steam 126, and carbon dioxide 128. As described in further detail with respect to FIG. 2, the hydrogen 124 is isolated to form a product stream. The carbon monoxide 122 can be catalytically converted to carbon dioxide 128, and the carbon dioxide 128 can be captured for sale or reuse. Because of the capture the carbon dioxide 128, the hydrogen 124 is termed "blue hydrogen", or low-carbon hydrogen.

While the steam 126 and waste oxidizer stream 118 will remove some of the heat generated in the SOFC 100, in some embodiments, the housing includes a cooling system 132 for removing heat, such as steam generating coils, oil coolant coils, and the like. Although not shown, in some embodiments, the cooling system 132 includes lines or coils in contact with the EA 110 to remove heat.

If the SOFC 100 is used in reversible operation as an SO electrolytic cell (SOEC), heat generated during operation as an SOFC may be stored for use during electrolysis. For example, in an embodiment, the heat removed by the cooling system 132 during operation as the SOFC 100 is stored in a reservoir as a molten salt, which is returned to provide heat during the endothermic electrolysis process. In some embodiments, the heat generated by the SOFC 100 is utilized in a process, for example, used to generate power through a sterling engine or other energy capture device.

Figure 2:
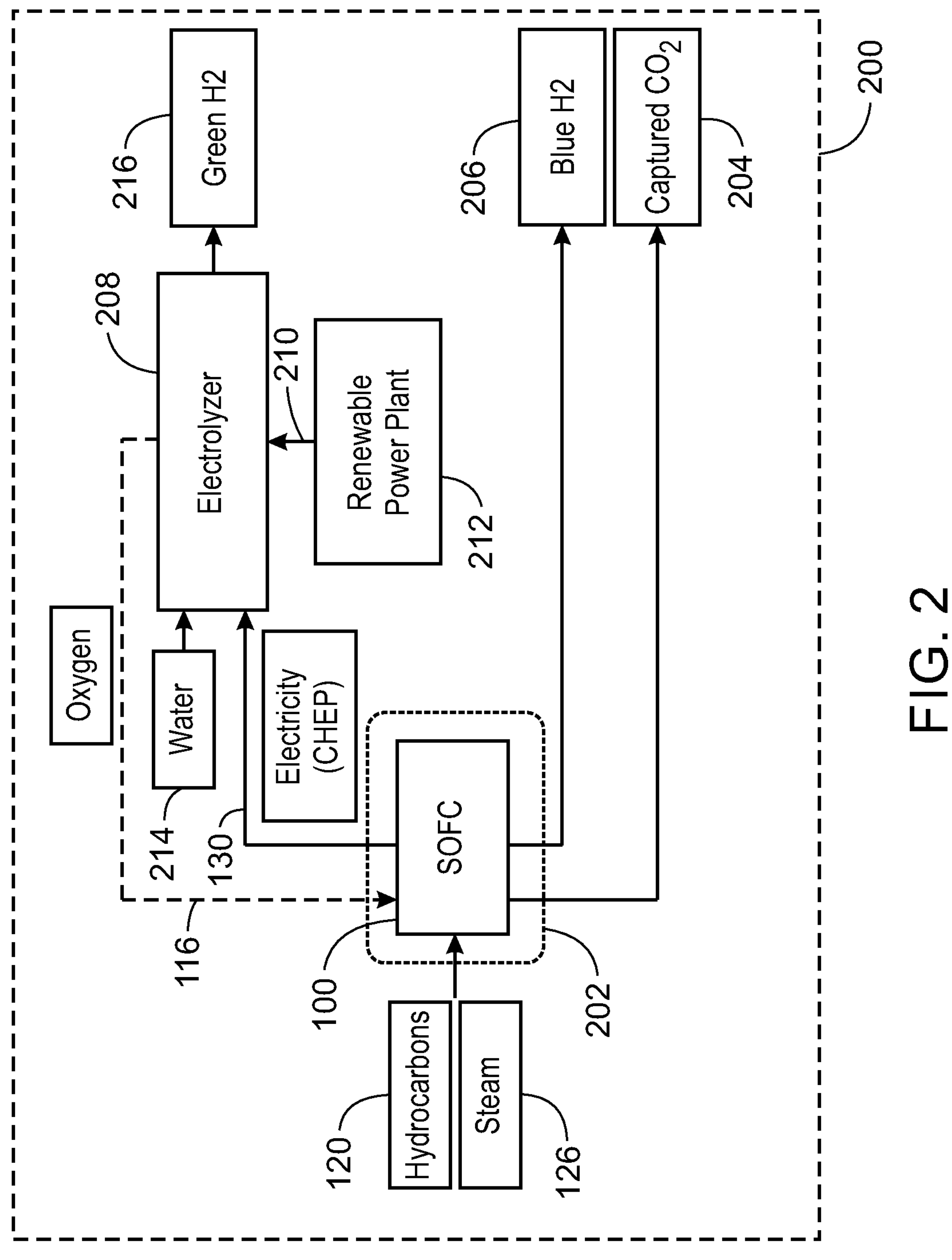
FIG. 2 is a schematic drawing of an integrated hydrogen production system in normal operation.

FIG. 2 is a schematic drawing 200 of an integrated hydrogen production system in normal operation. Like numbered items are as described with respect to FIG. 1. The CHEP 202 includes the SOFC 100, as described with respect to FIG. 1. In this embodiment, the CHEP 202 produces captured carbon dioxide 204. As described with respect to FIG. 1, the carbon monoxide in the exhaust stream from the SOFC 100 that is present with the carbon dioxide can be catalytically converted to carbon dioxide. The carbon dioxide can then be separated from the hydrogen, for example, by a membrane separator, an amine separator, or a cryogenic separator, among others. The captured carbon dioxide 204 can then be provided as a product stream to a pipeline, for example, for enhanced oil recovery, sequestration, or use in a chemical process, among others. The separated hydrogen can be dried and provided as blue hydrogen 206, for example, to a product stream pipeline, storage tanks, shipping tanks, and the like.

At least a portion of the oxidizing gases used by the SOFC 100 includes oxygen 116 from an electrolyzer 208. The electrolyzer 208 is partially powered by electricity 130 from the SOFC 100 and by electricity 210 from a renewable power plant 212. In various embodiments, the renewable power plant 212 is a solar electric plant, a solar thermal plant, a wind generating plant, or a combination thereof. The renewable power plant 212 may be located at the same site as the CHEP 202, and the refinery or chemical plant providing the fuel 120 and steam 126.

The water 214 used by the electrolyzer 208 to produce hydrogen and oxygen may be obtained from produced water, wastewater, seawater, and the like. In some embodiments, the water 214 is purified, for example, by nanofiltration, or reverse osmosis, to lower the concentration of salts. Other electrolytes, such as sodium hydroxide, can be added to the water 214 to increase the yield of hydrogen and oxygen, and decrease the potential for the electrolysis, increasing the efficiency.

The electrolyzer 208 produces green hydrogen 216 from the electricity 210 provided by the renewable power plant 212. In the embodiment shown in FIG. 2, a portion of the green hydrogen 216 is produced by the electricity 130 from the SOFC 100 and would be considered to be blue hydrogen.

The CHEP 202 can control the production rate of electricity 130, while producing blue hydrogen 206 with capture of the $CO_2$ 204. The CHEP 202 can provide the electricity 130 required for operation of the electrolyzer 208 when the supply of renewable electricity is limited, for example, at night or on a windless day. Further, the CHEP 202 can swing capacity between the generation of hydrogen and electricity. For example, if more hydrogen generation is needed, it may be more efficient to generate less electricity and increase the generation of hydrogen, for example, in a high hydrogen production mode. If less hydrogen is needed, the CHEP 202 can be used to generate more electricity, for example, for use in a utility grid, in a high electricity production mode. This is discussed further with respect to FIG. 5.

The CHEP 202 can always be on-stream to provide the electricity 130 and blue hydrogen 206 so long as the hydrocarbons 120 are fed to the SOFC. This is discussed further with respect to FIG. 3.

Figure 3:
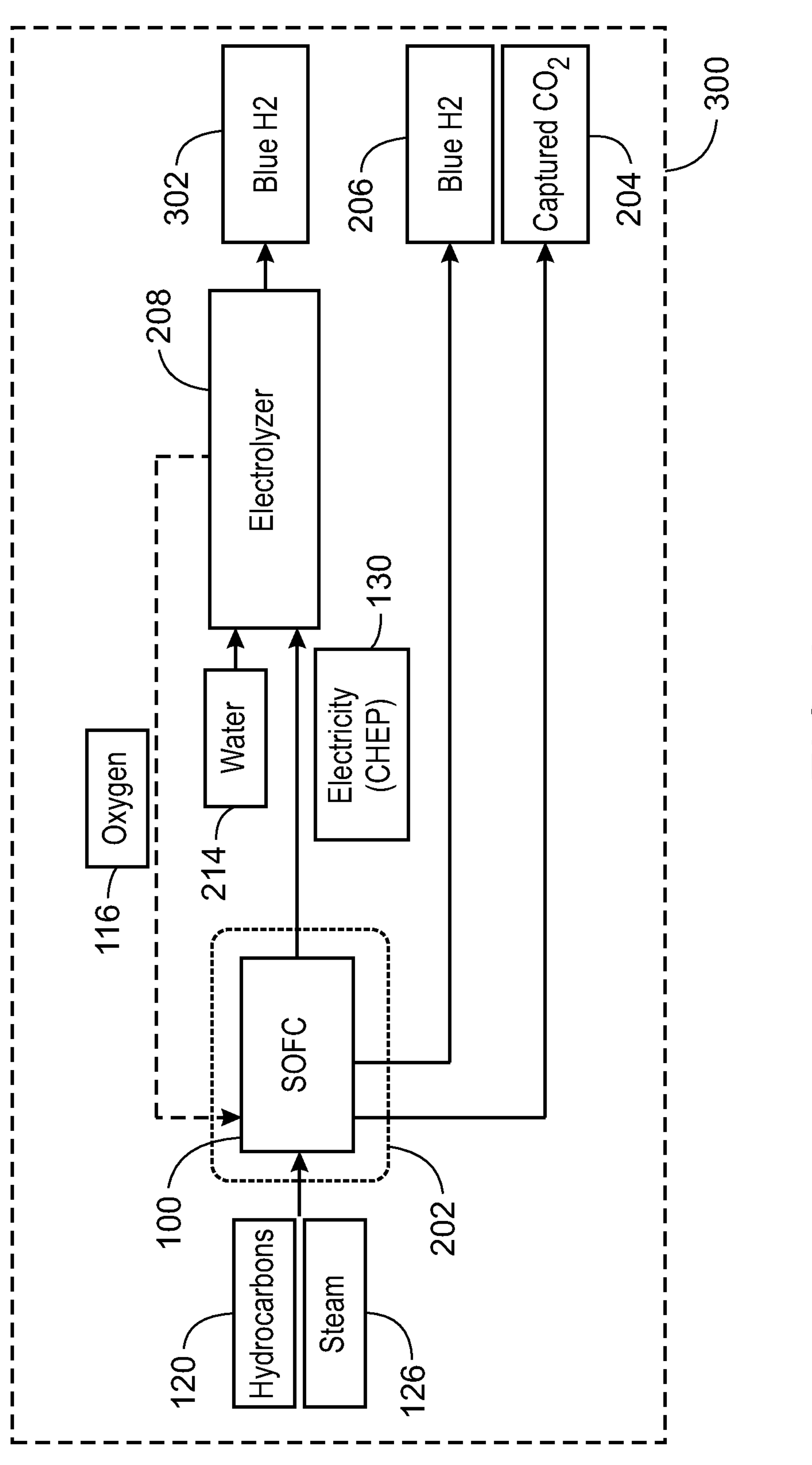
FIG. 3 is a schematic drawing of an integrated hydrogen production system operating with low renewable energy.

FIG. 3 is a schematic drawing 300 of an integrated hydrogen production system operating with low renewable energy. Like numbered items are as described with respect to FIGS. 1 and 2. In this scenario, when renewable electricity is not available, e.g., when the sun is not shining or the wind is not blowing, the electricity 130 needed for the electrolyzer 208 is provided by the CHEP 202 to produce additional blue hydrogen 302. As a result, shutdown of the electrolyzer 208 is not needed. The CHEP 202 would swing into maximum electricity generation mode. Some blue hydrogen 206 is still produced at the CHEP 202, although at a smaller volume.

Figure 4:
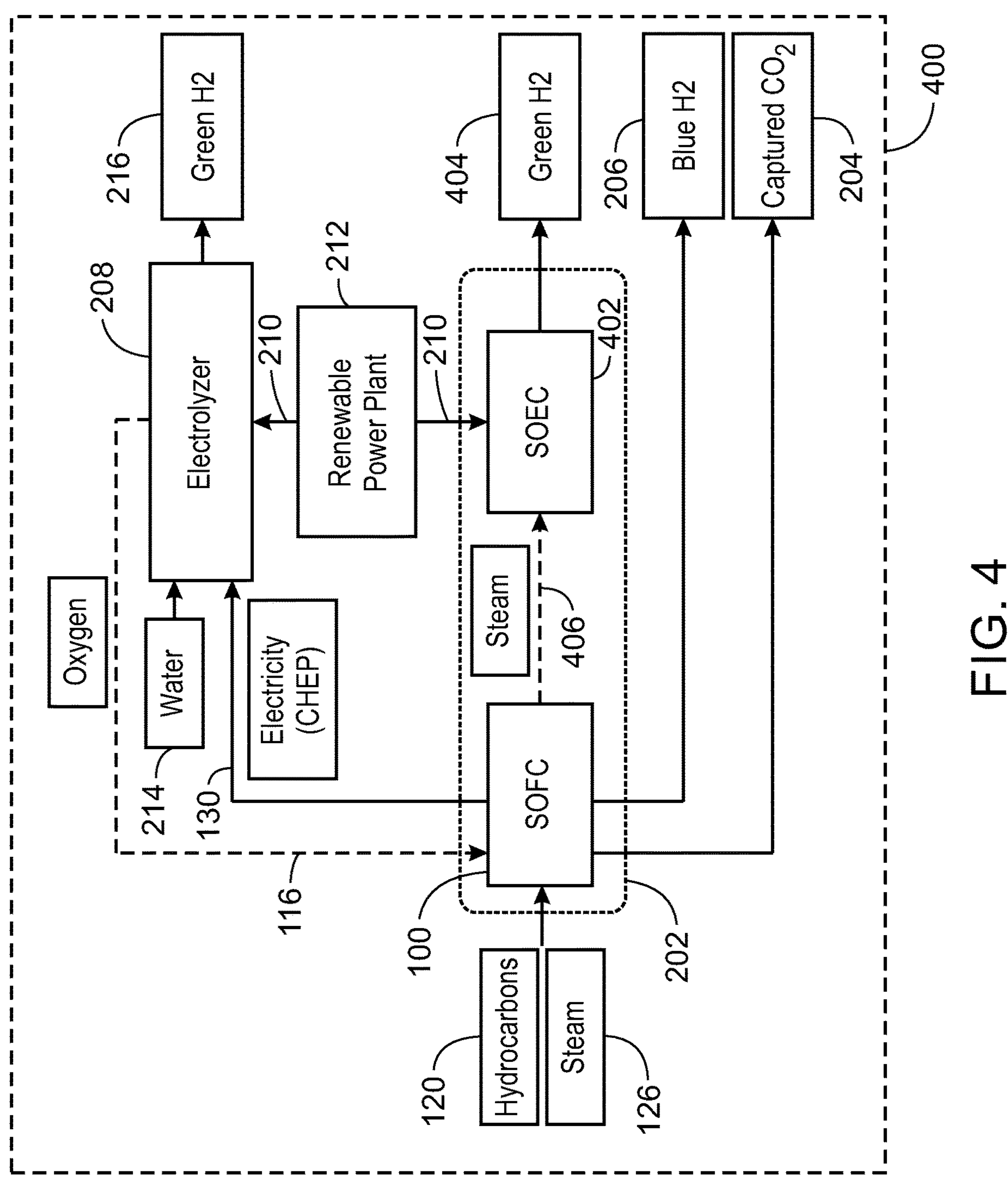
FIG. 4 is a schematic drawing of an integrated hydrogen production system with a surplus of renewable electricity.

FIG. 4 is a schematic drawing 400 of an integrated hydrogen production system with a surplus of renewable electricity. Like numbered items are as discussed with respect to FIGS. 1 and 2. In this scenario, the SOFC 100 for the CHEP 202 is used to generate electricity 130, but some of the SOFC 100 units in the stack are operated in reverse, functioning as solid oxide electrolyzer cells (SOEC) 402. In addition to the green hydrogen 216 from the electrolyzer 208, the electricity 210, which is in excess, from the renewable power plant 212 is used to produce additional green hydrogen 404 from the stacks of the SOEC 402. Steam 406 generated by heat recovery from the remaining SOFC 100 units in operation can be used as a feed to the SOEC 402, further improving the overall efficiency of the production of green hydrogen 216 and 404.

Figure 5:
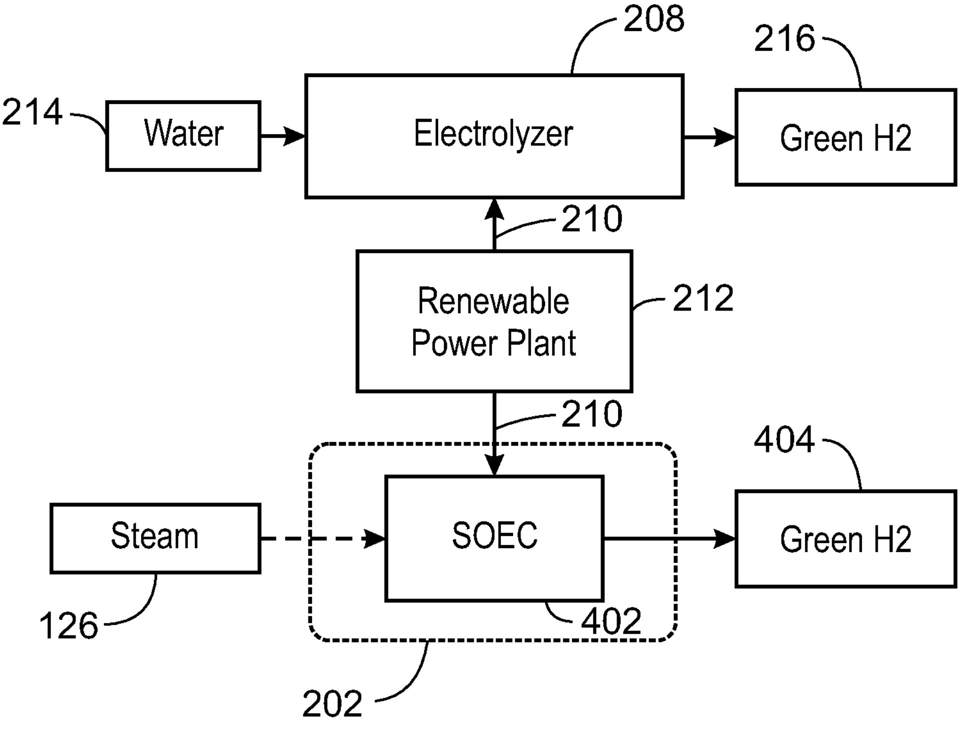
FIG. 5 is a schematic drawing of an integrated hydrogen production system with an excess of renewable electricity.

FIG. 5 is a schematic drawing 500 of an integrated hydrogen production system with a large excess of renewable electricity. Like numbered items are as described with respect to FIGS. 1, 2, and 4. As described herein, the CHEP 202 may generate more hydrogen and less electricity, for example, at the operational limit of a high hydrogen production mode. In this scenario, all of the SOFC 100 units of the CHEP 202 are operated as SOEC 402 to produce green hydrogen 216 and 404, without producing electricity from the SOFC 100. Thus, renewable electricity 210 is utilized to produce the green hydrogen 216 and 404 at a lower cost than other sources. The steam 126 used by the SOEC 402 is produced by and existing facility, such as an associated refinery or chemical plant, for the CHEP 202.

Figure 6:
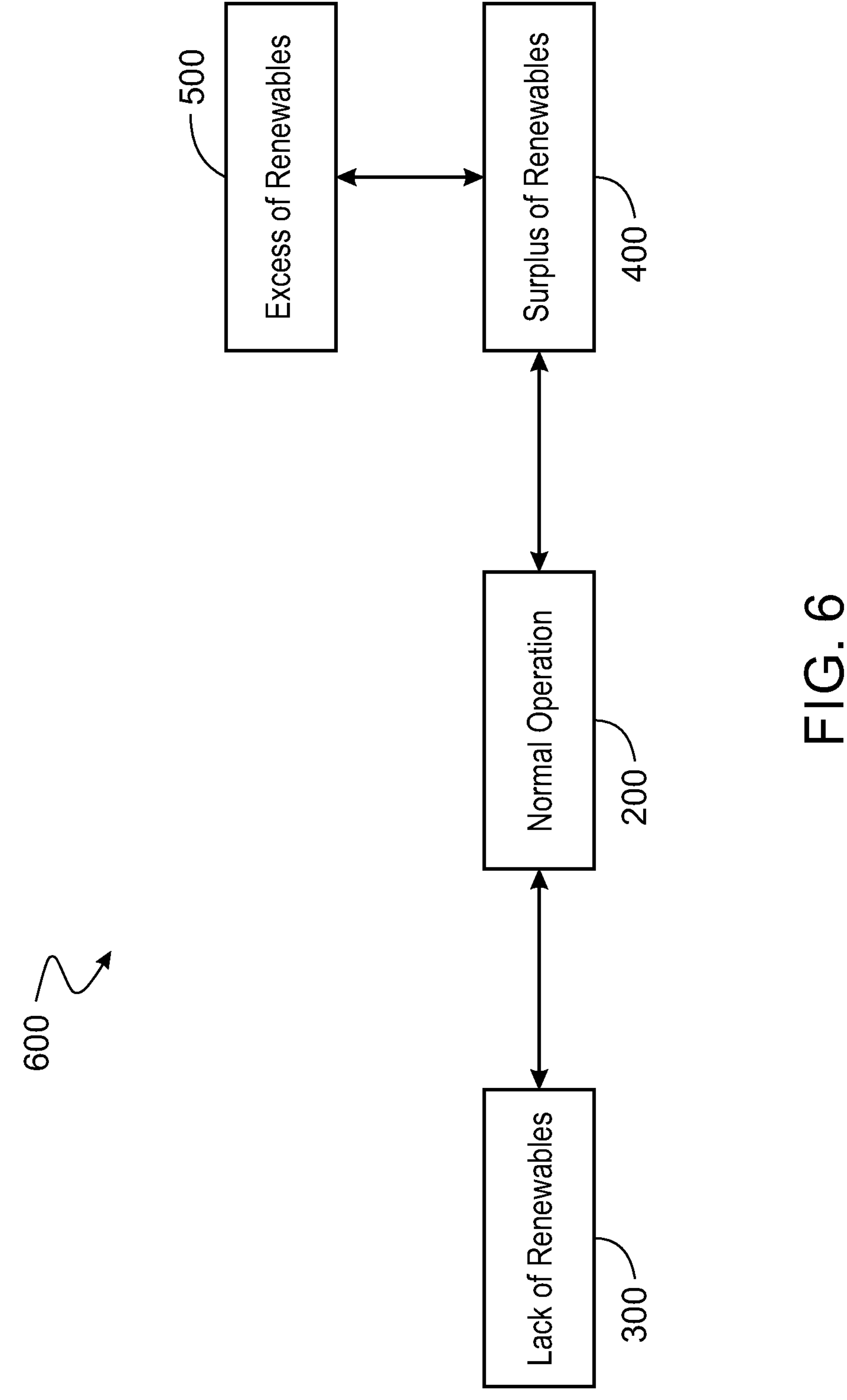
FIG. 6 is a schematic drawing of an integrated hydrogen production system switching between operating modes based on the availability of renewable energy.

FIG. 6 is a schematic drawing 600 of an integrated hydrogen production system switching between operating modes based on the availability of renewable energy. Like numbered items are as described with respect to previous figures. Assuming that some electricity is available from the renewable energy plant, the normal operation of the integrated system produces the products described with respect to schematic drawing 200 of FIG. 2, e.g., blue hydrogen, green hydrogen, and carbon dioxide. If renewable energy is not available, for example, at night, operations switch to the schematic drawing 300 described with respect to FIG. 3. If a surplus of renewable energy is available, the operations switch to the mode shown in the schematic drawing 400 of FIG. 4, in which a portion of the SOFC stack is switch to functioning as an SOEC stack. If a large excess of renewable energy is available, the SOFC stack may be completely reversed, with all units functioning as SOEC, and electrical power from the renewable energy plant may be used to generate green hydrogen from both the electrolyzer and the SOEC stack.

Figure 7:
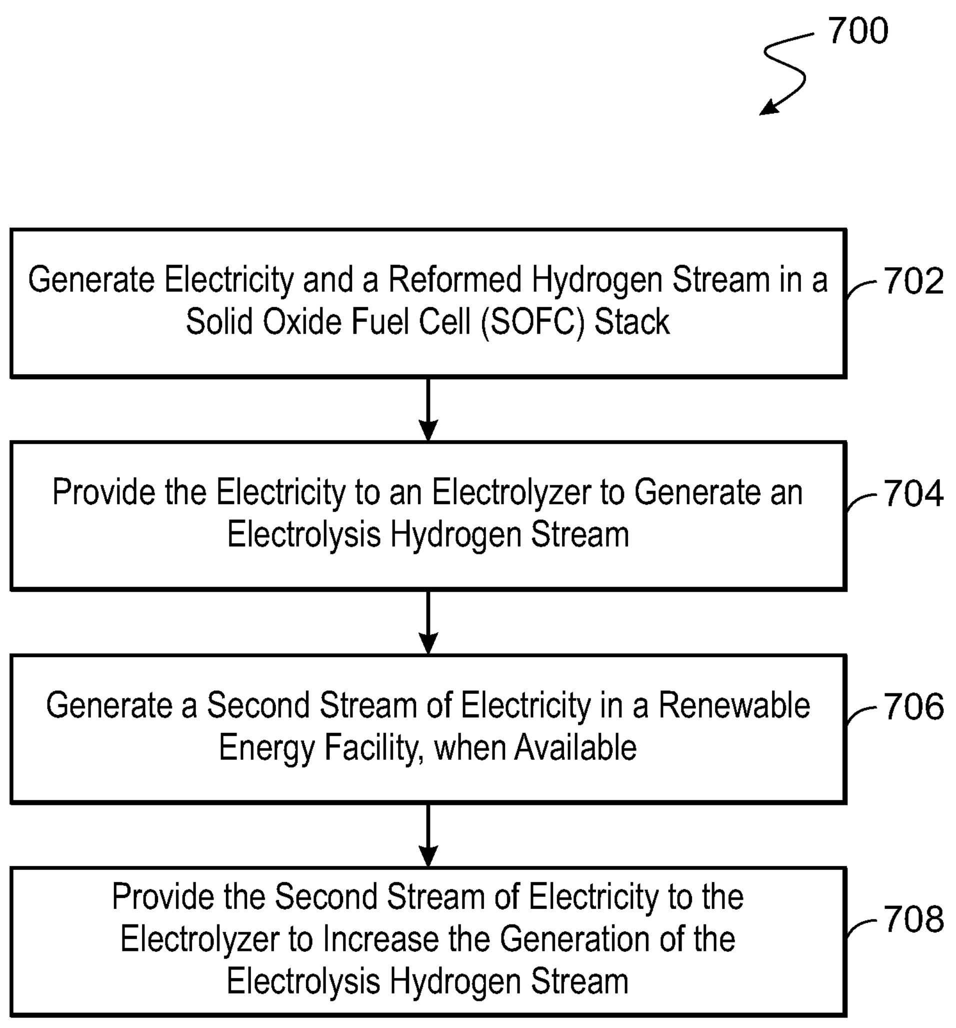
FIG. 7 is a process flow diagram of a method for integrating energy flows from a renewable energy source and a solid oxide fuel cell.

FIG. 7 is a process flow diagram of a method 700 for integrating energy flows from a renewable energy source and a solid oxide fuel cell. The method begins at block 702, when electricity and a reformed hydrogen stream are generated in a solid oxide fuel cell. The carbon dioxide generated in the SOFC is captured for use in other processes. At block 704, the electricity is provided to electrolyzer to generate an electrolysis hydrogen stream.

At block 706, a second stream electricity is generated in a renewable energy facility, when available. When renewable energy is not available, all of the electricity used to operate the electrolyzer comes from the SOFC.

At block 708, the second stream electricity is provided to the electrolyzer to increase the generation of the electrolysis hydrogen stream. When excess electricity from the renewable energy facility is available, a portion of the SOFC stack is operated as a solid oxide electrolytic cell (SOEC) stack. The excess electricity from the renewable energy facility is provided to the SOEC stack to generate hydrogen. If sufficient excess electricity is available, all of the SOFC stack is operated as an SOEC stack. Electricity is provided from the renewable energy facility to power both the electrolyzer and the SOEC stack, generating a stream of electrolysis hydrogen stream from both. As described herein, this can be termed a high hydrogen mode of operation for the CHEP.

EMBODIMENTS

An embodiment described herein provides a method for integrating renewable power with a natural gas hydrogen production plant. The method include generating electricity and a reformed hydrogen stream in a solid oxide fuel cell (SOFC) stack, and providing the electricity to an electrolyzer to generate an electrolysis hydrogen stream. A second stream of electricity is generated in a renewable energy facility, when available, and providing the second stream of electricity to the electrolyzer to increase the generation of the electrolysis hydrogen stream.

In aspect, the method includes, when renewable energy is not available, providing the electricity from the SOFC to operate the electrolyzer to generate the electrolysis hydrogen stream.

In aspect, the method includes, when excess electricity from the second stream is available, operating a portion of the SOFC stack as a solid oxide electrolytic cell (SOEC) stack, and providing the excess electricity from the second stream to the portion of the SOFC stack operating as an SOEC stack.

In aspect, the method includes operating all of the SOFC stack as an SOEC stack, providing the electricity from the second stream to power both the electrolyzer and the SOEC stack, and generating the electrolysis hydrogen stream in both the electrolyzer and the SOEC stack.

In aspect, the method includes providing steam from the SOFC stack to the SOEC stack. In aspect, the method includes providing steam from a chemical plant or refinery to the SOEC stack.

In aspect, the method includes capturing carbon dioxide generated in the SOFC. In aspect, the method includes providing the carbon dioxide as a product stream. In aspect, the method includes using the carbon dioxide in enhanced oil recovery.

In aspect, the method includes providing an oxygen stream generated in the electrolyzer to the SOFC.

In aspect, the method includes providing a steam stream to the SOFC.

In aspect, the method includes providing a natural gas stream to the SOFC.

Another embodiment described herein provides an integrated hydrogen production system. The integrated hydrogen production system includes a solid oxide fuel cell (SOFC), wherein at least a portion of the SOFC can be operated as a solid oxide electrolytic cell (SOEC), an electrolyzer electrically coupled to a power line from the SOFC. A carbon dioxide capture system is fluidically coupled to an exhaust line from the SOFC. A steam source is fluidically coupled to the SOFC. A hydrocarbon source is fluidically coupled to the SOFC to provide a gaseous hydrocarbon feed to the SOFC, and a renewable energy source, wherein the electrolyzer is coupled to a power line from the renewable energy source.

In an aspect, the integrated hydrogen production system includes an oxygen line from the electrolyzer to the SOFC.

In an aspect, the steam source includes a refinery, chemical plant, or both.

In an aspect, the integrated hydrogen production system includes a power line from the renewable energy source to the portion of the SOFC that is operated as an SOEC.

In an aspect, the hydrocarbon source includes a gas plant, wherein gaseous hydrocarbon feed includes natural gas.

In an aspect, the integrated hydrogen production system includes a pyrolysis unit, wherein the gaseous hydrocarbon feed includes pyrolysis gas.

In an aspect, the integrated hydrogen production system includes a water gas shift reactor, wherein the gaseous feed includes water gas.

In an aspect, the renewable energy source includes a solar power plant. In an aspect, the renewable energy source includes a wind generation facility.

Other implementations are also within the scope of the following claims.

What is claimed is:

1. A method for integrating renewable power with a natural gas hydrogen production plant, comprising:
- generating electricity and a reformed hydrogen stream in a solid oxide fuel cell (SOFC) stack;
- providing the electricity from the SOFC stack to an electrolyzer to generate an electrolysis hydrogen stream;
- generating a second stream of electricity in a renewable energy facility, when available;
- providing the second stream of electricity to the electrolyzer to increase the generation of the electrolysis hydrogen stream;
- when excess electricity from the second stream of electricity is available:
  - operating a portion of the SOFC stack as a solid oxide electrolytic cell (SOEC) stack;
  - providing the excess electricity from the second stream of electricity to the SOEC stack; and
  - generating hydrogen with the SOEC stack while a remainder of the SOFC stack continues to generate the reformed hydrogen stream and electricity.

2. The method of claim 1, comprising, when renewable energy is not available, providing the electricity from the SOFC to operate the electrolyzer to generate the electrolysis hydrogen stream.

3. The method of claim 1, comprising:
- operating all of the SOFC stack as the SOEC stack;
- providing the electricity from the second stream to power both the electrolyzer and the SOEC stack; and
- generating the electrolysis hydrogen stream in both the electrolyzer and the SOEC stack, without generating electricity in the SOFC stack.

4. The method of claim 1, comprising providing steam from the SOFC stack to the SOEC stack.

5. The method of claim 3, comprising providing steam from a chemical plant or refinery to the SOEC stack.

6. The method of claim 1, comprising capturing carbon dioxide generated in the SOFC.

7. The method of claim 6, comprising providing the carbon dioxide as a product stream.

8. The method of claim 6, comprising using the carbon dioxide in enhanced oil recovery.

9. The method of claim 1, comprising providing an oxygen stream generated in the electrolyzer to the SOFC.

10. The method of claim 1, comprising providing a steam stream to the SOFC.

11. The method of claim 1, comprising providing a natural gas stream to the SOFC.

12. The method of claim 1, comprising:
- separating carbon dioxide, by a carbon dioxide separator, from the reformed hydrogen stream; and
- providing the reformed hydrogen stream, after separating the carbon dioxide, to a hydrogen tank fluidically coupled to the SOFC exhaust.

13. An integrated hydrogen production system, comprising:
- a solid oxide fuel cell (SOFC) configured to generate electricity and a reformed hydrogen stream, wherein a portion of the SOFC can be operated as a solid oxide electrolytic cell (SOEC);
- an electrolyzer electrically coupled to a power line from the SOFC, wherein the electrolyzer is configured to receive the electricity from the SOFC to generate an electrolysis hydrogen stream;
- a carbon dioxide capture system fluidically coupled to an exhaust line from the SOFC,
- a steam source fluidically coupled to the SOFC;
- a hydrocarbon source fluidically coupled to the SOFC to provide a gaseous hydrocarbon feed to the SOFC;
- a renewable energy source, wherein the electrolyzer is coupled to a power line from the renewable energy source and the renewable energy source is configured to generate a second stream of electricity and provide the second stream of electricity to the electrolyzer to increase the generation of the electrolysis hydrogen stream;
- a power line from the renewable energy source to the portion of the SOFC that can be operated as an SOEC;
- wherein, the integrated hydrogen production system is configured to:
  - operate a portion of the SOFC as an SOEC when excess electricity from the second stream of electricity is available;
  - provide the excess electricity from the second stream of electricity to the SOEC; and
  - generate hydrogen with the SOEC while a remainder of the SOFC generates the reformed hydrogen stream and electricity.

14. The integrated hydrogen production system of claim 13, comprising an oxygen line from the electrolyzer to the SOFC.

15. The integrated hydrogen production system of claim 13, wherein the steam source comprises a refinery, chemical plant, or both.

16. The integrated hydrogen production system of claim 13, wherein the hydrocarbon source comprises a gas plant, and wherein the gaseous hydrocarbon feed comprises natural gas.

17. The integrated hydrogen production system of claim 13, comprising a pyrolysis unit, wherein the gaseous hydrocarbon feed comprises pyrolysis gas.

18. The integrated hydrogen production system of claim 13, comprising a water gas shift reactor, wherein the gaseous hydrocarbon feed comprises water gas.

19. The integrated hydrogen production system of claim 13, wherein the renewable energy source comprises a solar power plant.

20. The integrated hydrogen production system of claim 13, wherein the renewable energy source comprises a wind generation facility.

21. The integrated hydrogen production system of claim 13, further comprising:

a carbon dioxide separator fluidically coupled to the exhaust line of the SOFC and configured to separate hydrogen and carbon dioxide from the SOFC exhaust; and a tank fluidically coupled to the SOFC exhaust and configured to receive hydrogen from the carbon dioxide separator.

* * * * *